US005083486A

United States Patent [19]

[11] Patent Number: 5,083,486

[45] Date of Patent: Jan. 28, 1992

Allison et al.

[54] METHOD AND APPARATUS FOR TRIMMING CONTAINERIZED DEODORANT PRODUCTS

[75] Inventors: George Allison, Brick Town; Stuart Lawrence, Point Pleasant; Roy Valeo, Toms River, all of N.J.

[73] Assignee: Fluid Packaging Co., Lakewood, N.J.

[21] Appl. No.: 244,327

[22] Filed: Sep. 15, 1988

[51] Int. Cl.⁵ .......................... B23D 23/02; B26D 7/06

[52] U.S. Cl. .......................................... 83/23; 83/171; 83/267; 83/411.007; 83/416; 83/599; 83/409.2; 83/411.7

[58] Field of Search ...................... 83/16, 23, 168, 171, 83/267, 409.2, 410.9, 411.7, 416, 471.1, 597, 599, 914

[56] References Cited

U.S. PATENT DOCUMENTS

| | | | |
|---|---|---|---|
| 3,791,245 | 2/1974 | Eggert | 83/914 |
| 3,924,315 | 12/1975 | Cady et al. | 83/914 |
| 4,041,672 | 8/1977 | Gularte | 83/409.2 |
| 4,287,748 | 9/1981 | Wolfthal | 83/267 |
| 4,327,616 | 5/1982 | Klakis | 83/409.2 |
| 4,841,826 | 6/1989 | Smith, III | 83/862 |

*Primary Examiner*—Frank T. Yost
*Assistant Examiner*—Scott A. Smith
*Attorney, Agent, or Firm*—Clifford G. Frayne

[57] ABSTRACT

A method and apparatus for trimming solid stick deodorants to provide for a protruding rounded deodorant stick in the container in a continuous manner on subsequent deodorant sticks whereby the deodorant stick is brought into registration with a means for raising the solid deodorant stick to a predetermined height, the deodorant stick then being transported into registration with a rotating knife which trims the deodorant stick and imparts a rounded oval configuration to the top of the deodorant stick, the deodorant stick then being transported to a conveyor and released for further packaging. The apparatus and method accomplishes the trimming in a continuous and automatic manner.

6 Claims, 4 Drawing Sheets

METHOD AND APPARATUS FOR TRIMMING CONTAINERIZED DEODORANT PRODUCTS

FIELD OF INVENTION

This invention relates to a method and apparatus for continuously trimming the deodorant stick within a deodorant container in order to provide for an aesthetic appearance.

BACKGROUND OF THE INVENTION

Solid deodorants and antiperspirants have been manufactured in the marketplace for some time. These deodorants and antiperspirants are normally manufactured by means of an automatic rotary molding machine or a piston-type filler wherein the actual ingredients for the deodorant stick are mixed and then formed into the appropriate shape for containerization.

In practice, deodorant sticks after having been placed in the container, are subjected to heating or cooling finishing, if necessary.

The deodorant stick is normally recessed within the container, with the container having a removable frictionally engageable cap. In operation, the purchaser, removes the cap and by means of a thumbscrew means located on the bottom of the container urges the actual deodorant stick upwardly until a portion of the deodorant stick protrudes above the lip of the container. The purchaser then may use the deodorant for the application of the deodorant and antiperspirant to the body.

In past practices, the deodorant stick when it is first maneuvered upwardly from the container presents a flat upper surface with a well-defined circumferential edge. After a period of time, the use of the deodorant stick causes it to conform to the shape of the user's underarm.

Manufacturers have long sought an economic and efficient method to provide an aesthetically pleasing solid deodorant and antiperspirant such that when the user initially removed the cap, the user is presented with a deodorant stick which already protrudes from the container and is of an oval shape such that it will readily conform to the shape of the user's anatomy with the initial usage. The ability to produce a stick deodorant of such a shape, provides not only an aesthetic appearance, but a practical application for the ability of the user to evenly apply the stick deodorant even with the initial use of the product.

Applicant has developed a method and apparatus which provides for such a shape on the solid deodorant stick and antiperspirant in an expedient and economical manner with little waste of the product.

OBJECTS OF THE INVENTION

An object of the present invention is to provide a novel and continuous apparatus for trimming the top of oval stick deodorants.

A further object of the present invention is to provide a novel apparatus for trimming the top of a solid stick deodorant in a continuous manner.

A still further object of the present invention is to provide a novel method for the positioning and registering of the stick deodorant for trimming the top of the deodorant stick.

A still further object of the present invention is to provide a novel method and apparatus for the trimming of a stick deodorant in which the stick deodorant is automatically raised to a predetermined height and then subjected to an automatic trimming apparatus.

SUMMARY OF THE INVENTION

These and other objects of the present invention are achieved by a method and apparatus whereby a stick deodorant container, with the solid stick deodorant contained therein, without a cap means, is transported by a conveyor means to a position where the deodorant stick container is placed in registration with one of a plurality of gripping means, the gripping means rotating about a central axis, the deodorant stick container is then rotated into registration and automatic rotable means which raises the stick deodorant within the container to a predetermined height, the container and stick deodorant are then placed in registration with a knife means rotating about a vertical axis, a knife means and shield means operating simultaneously to trim the top of the deodorant stick into an oval shape and to direct the trimmed material downwardly into a waste container, the deodorant stick then placed in registration with a second conveyor means where the stick deodorant is automatically released from the gripping means and is transported to a means for placing a cap on the deodorant stick.

BRIEF DESCRIPTION OF DRAWINGS

A better understanding of the present invention as well as other objects and advantages thereof will become apparent upon consideration of the detailed disclosure thereof especially when taken with the accompanying drawings wherein.

DETAILED DESCRIPTION OF THE DRAWINGS

Figure 1:
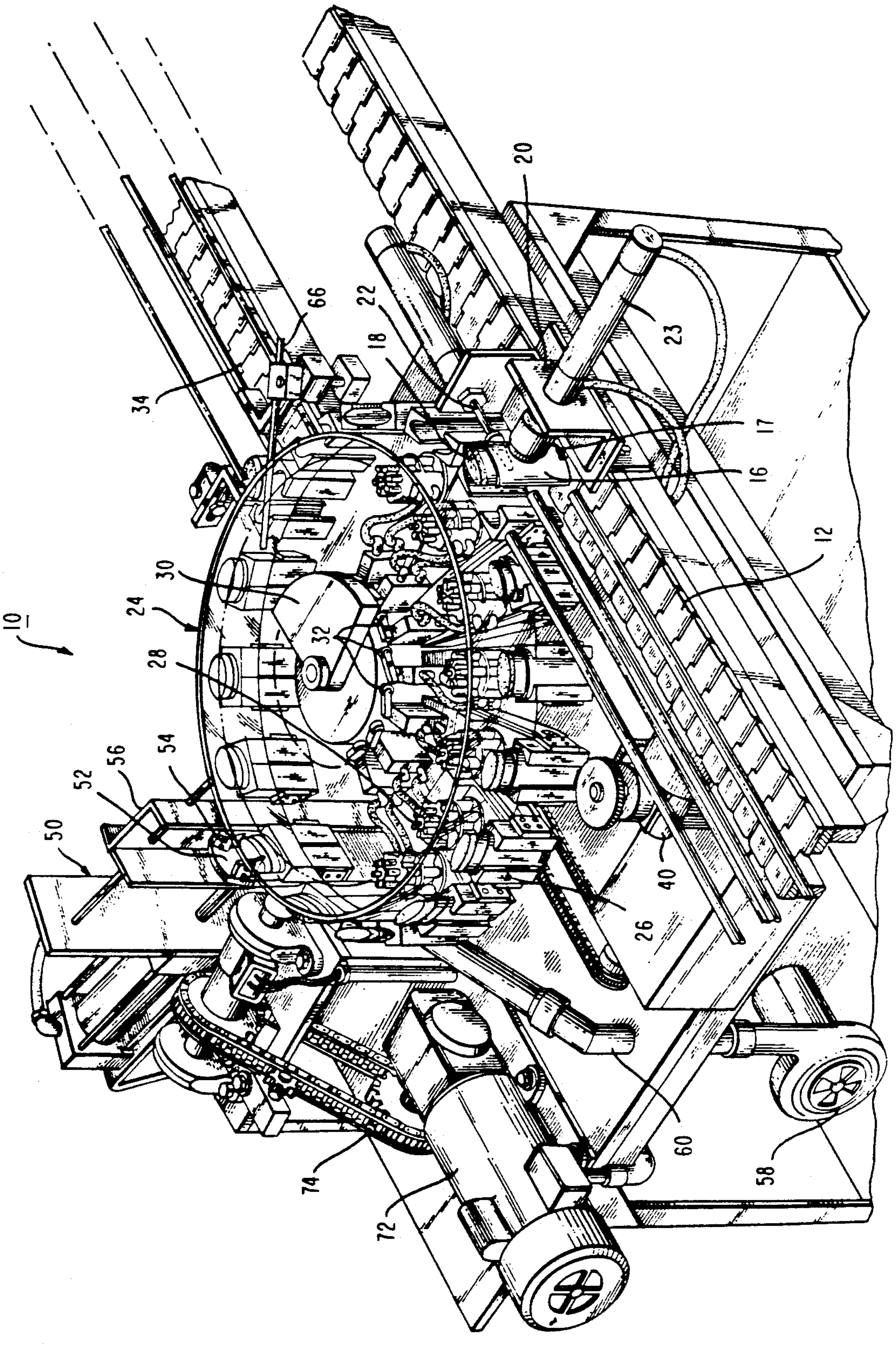
FIG. 1 is a perspective view of the conveyor means and automatic rotary cutting device.

Referring to FIG. 1, there is shown a perspective of the view trimming station 10 for automatically raising the deodorant stick within the deodorant stick container and positioning the deodorant stick container such that the protruding deodorant stick is subjected to a rotary blade action to trim the top of the deodorant stick to an oval configuration.

Figure 2:
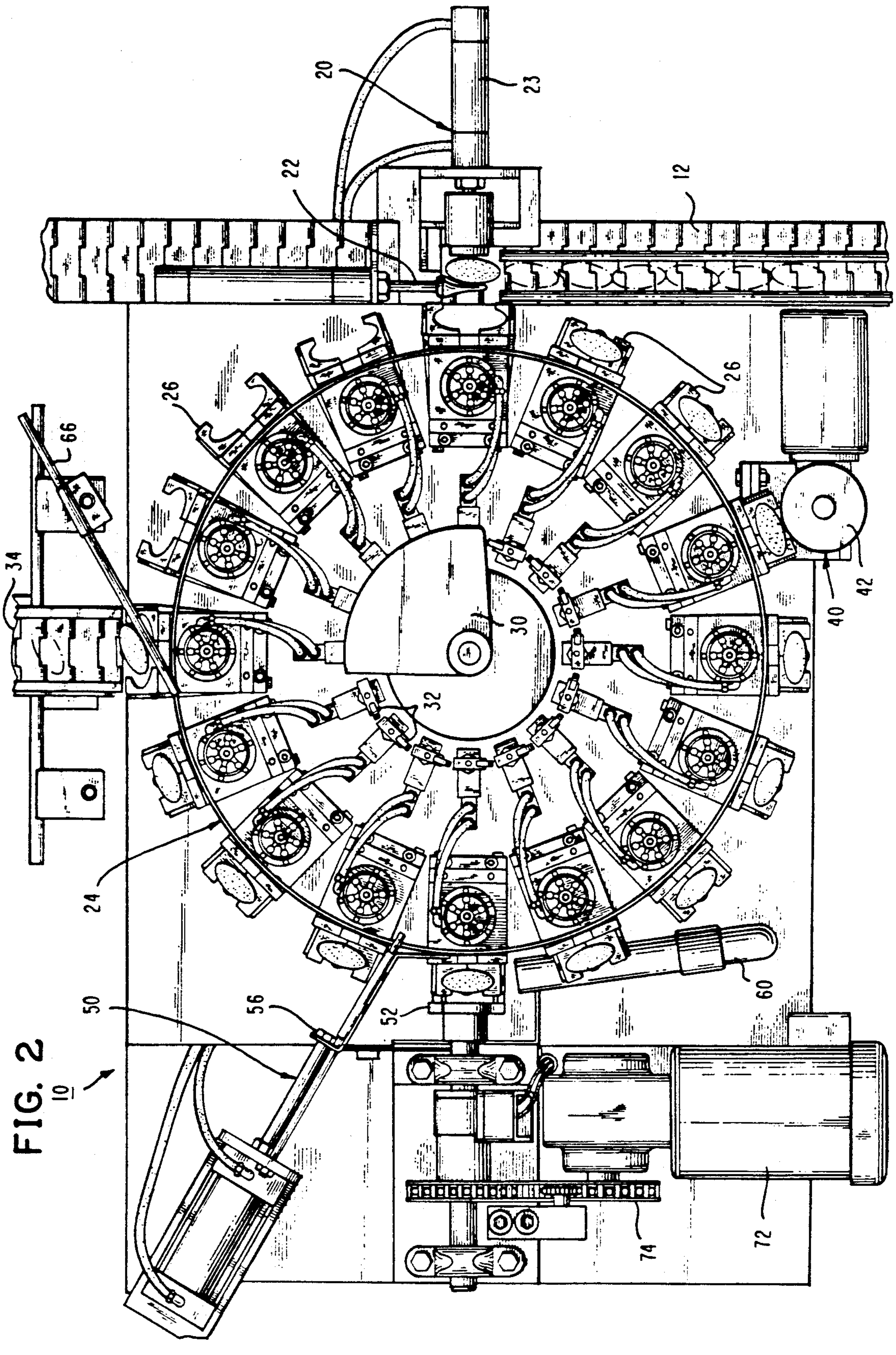
FIG. 2 is a top planer view of the automatic rotary cutting device.
Figure 3:
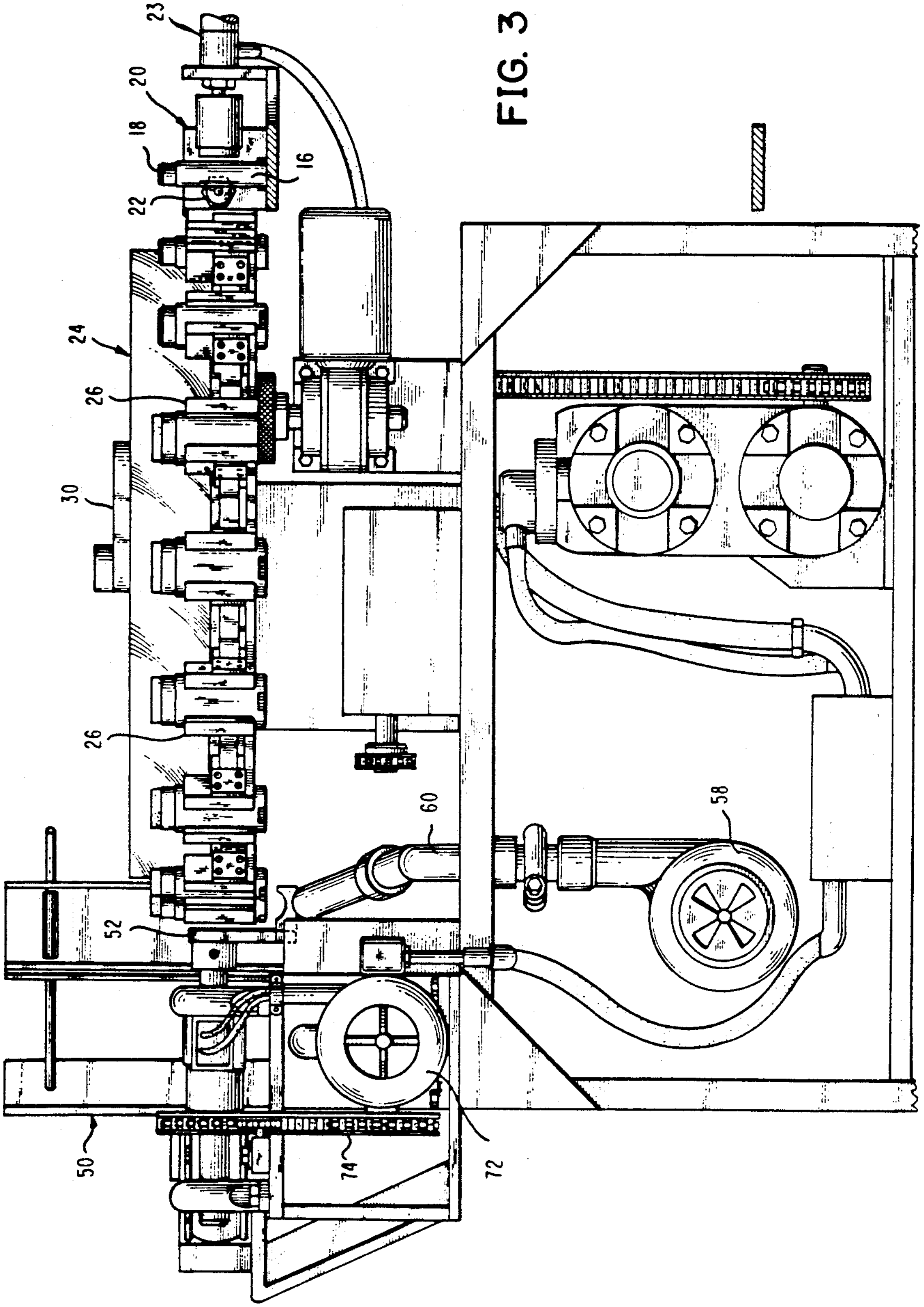
FIG. 3 is a side elevational view of the automatic rotary cutting device.

FIG. 2 discloses a top planer view of the trimming station and FIG. 3 is an end elevational view of the trimming station 10.

With reference to FIG. 1, there is shown a first conveyor means 12 which transports deodorant container 16 with deodorant stick 18 contained therein. Conveyor means 12 provides a continuous flow of deodorant containers 16 to feeding station 20. Feeding station 20 comprises an hydraulically-operated aligning rod 22 and an hydraulically-operated feeding plunger 24. Aligning rod 22 and feeding plunger 24 serve to position the deodorant container 16 in a position so as to feed into rotary transport station 24.

As can best be seen with reference to FIGS. 1 and 2, rotary transport 24 is comprised of a plurality of jaw members 26, jaw members 26 being operated by electrical solenoid control 28 to dispose jaw members 26 from an open to a closed position. In the closed position, jaw members 26 conform substantially to the cross sectional area of deodorant stick container 16. The solenoid controls 28 for jaw members 26 are activated by cam means 30 mounted on top of rotary transport station 24 such that jaw members 26 are in the open position when they are in registration with feed station 20. When deodorant stick container 16 is positioned at feed station 20 and in alignment by means of aligning rod 22, aligning rod 22 is hydraulically withdrawn and feed plunger 24 is hydraulically extended to feed deodorant stick container 16 into the open jaw member 26 in registration with the feed station. The rotary movement of rotary transport station 24 takes the jaw member 26 and deodorant stick container 16 in a clockwise position and an activator switch 32 is released after passing under cam 30 such that the jaw members automatically close about deodorant container 16. After the jaw members and deodorant stick container have traversed approximately three-quarters of the distance around the rotary transport station and been subjected to the cutting means, cam 30 by means of activator switches 32 connected to each jaw member, automatically opens jaw means 26 to permit the release of deodorant stick container 16 onto a second conveyor means 34 which automatically transports the deodorant container to a capping and packing station. It can best be seen with reference to FIG. 2, the top planer view of the trimming station as to the relationship between cam means 30, jaw members 26 and the relative positioning of feed conveyor means 12 and exiting conveyor means 34.

Deodorant stick containers normally have a knurled adjusting knob 17 proximate to the base of the container, knurled adjusting knob 17 utilized by the user to raise the deodorant stick upwardly as it is depleted by rotating the knurled adjustment knob. Deodorant stick container 16 containing the deodorant stick 18 normally arrives at the feed station 20 with the deodorant stick solidified at or slightly below the top of deodorant stick container 16. Therefore, in order to trim the deodorant stick, it is necessary to raise the deodorant stick 18 a predetermined height prior to subjecting it to the trimming means. This task is accomplished by means of a vertical adjustment station 40. The deodorant stick container 16, enclosed by jaw member 26, encounters the vertical adjustment station 40 immediately after the deodorant stick container 16 has been deposited in jaw member 26. Vertical adjustment station 40 comprises an electric motor means 42 which operates a rotating adjustment wheel 44 which rotates in a horizontal plane and whose circumference is tangential to the rotary transport station 24 such that the vertical edge of wheel 42 engages knurled adjustment knob 17 on deodorant stick container 16 for a predetermined sequential amount of time in order to raise the deodorant stick 18 to a predetermined height above the top of deodorant stick container 16. The height of such adjustment is governed by the rotating speed of adjustment wheel 42 and the rotating speed of rotating transport station 24.

Once deodorant stick 18 has been adjusted to a predetermined height above the top of deodorant stick container 16, it is ready to be subjected to the trimming step. Jaw member 26 containing deodorant stick container 16 and deodorant stick 18 continues its rotation o rotary transport station 24 until it is brought into registration with trimming station 50. At trimming station 50, several events occur simultaneously which will be described in detail hereafter. In principle, however, deodorant stick container 16 with the raised deodorant stick 18 is brought into registration with a rotatable vertically disposed arm 52 which in registration with deodorant stick container 16 is disposed substantially parallel thereto, arm 52 having mounted thereon, a plurality of arcuate blades 54 which arcuate blades in the preferred embodiment number two blades. Rotatable vertical arm 52 is hydraulically operated and is in sequential time with rotary transport station 24 such that when deodorant stick container 16 is in registration with rotatable vertical arm 52, the sequential timing system causes the hydraulic system to rotate arm 52 360° thereby causing arcuate blades 54 secured to arm 52 to trim or shave the exposed portion of deodorant stick 18 into an oval configuration, with the first blade 54 trimming a portion of deodorant stick 18 and the second blade 54 trimming an additional portion of deodorant stick 18 to obtain the desired oval configuration. Simultaneously with the operation of rotatable arm 52 and blades 54, a deflector shield 56 which is hydraulically operated is slidably positioned between the deodorant stick container 16 and deodorant stick 18 which is to be subject to the trimming mechanism and the deodorant stick container 16 and deodorant stick 18 which has just completed the trimming mechanism. This prevents the material trimmed from the deodorant stick 18 from possibly flying forward and accumulating on the deodorant stick which has just been trimmed. Deflector shield 56 is slidably withdrawn by hydraulic operation once the trimming task is completed and is repeatedly inserted between the deodorant stick container 16 to be trimmed and the deodorant stick container just trimmed in order to prevent such accumulation.

Additionally, in order to prevent the accumulation of trimmed material on the blades 54, a blower heating mechanism 58 is disposed below rotary transport station 24 and is in communication with the area proximate to the trimming station 50 by means of communication means 60 such that warm air is continuously provided to the trimming station 50 in the area proximate to blades 54. In this manner, the material trimmed from deodorant stick 18 is prevented from accumulating on blades 54 and is also prevented from accumulating on predecessor deodorant sticks by deflector shield 56 such that the trimmed material falls under the operation of gravity through an aperture 62 positioned below trimming station 50 where it is collected.

Once the trimming task is completed at trimming station 50, and deflector shield 56 is withdrawn, rotary transport station 24 rotates deodorant stick container 16 and the trimmed deodorant stick 18 to a position proximate to second conveyor means 34 wherein cam means 30 activates switch 32 such that jaw member 26 opens and a deflector rod 66 causes stick deodorant container 16 to release from jaw member 26 onto second conveyor means 34 for transport to the capping and packing station.

As best can be seen by reference to FIGS. 1, 2 and 3, Applicant has designed the trimming station to accommodate sixteen (16) jaw members on rotary transport station 24. The entire station operates under hydraulic power or electrical power with the sequencing steps designed to open and close jaw members 26 with the operation of aligning rod 22 and feed plunger 24 and to then bring deodorant stick container 16 in registration with trimming station 50 where the operation of rotatable vertical arm 52 and blades 54 is sequenced with the slidable insertion of deflector shield 56 and the removal of same and the transport of deodorant stick container 16 to second conveyor means 34 where the sequential opening of jaw members 26 is accomplished.

Specific reference and understanding of the trimming station 50 can best be understood with reference to FIGS. 4, 5, 6, and 7 which provide side and end elevational views of the deodorant stick container 16 and deodorant stick 18 in relationship to rotatable vertical arm 52 and blades 54.

Figure 4:
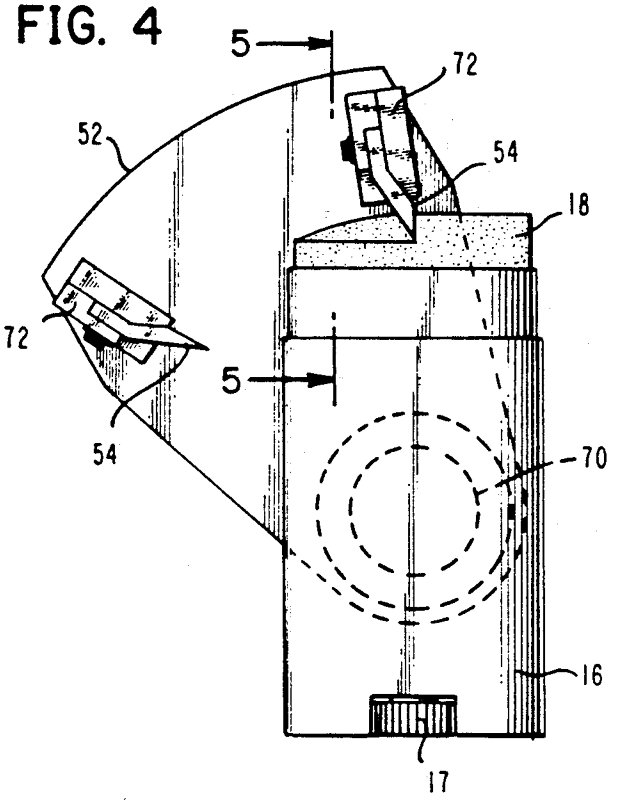
FIG. 4 is a side elevational view of the cutting device in relationship to a deodorant stick.
Figure 5:
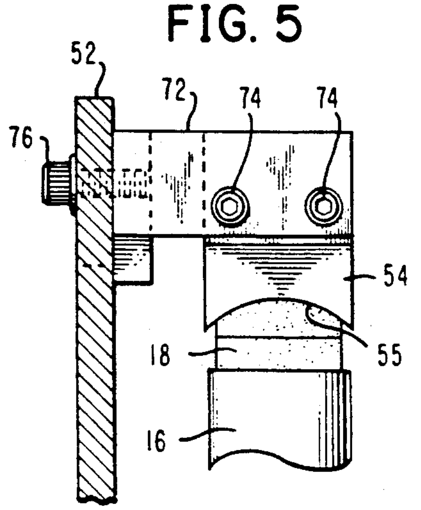
FIG. 5 is a end elevational view of the knife in relationship to the deodorant stick along plane 5—5 of FIG. 4.
Figure 6:
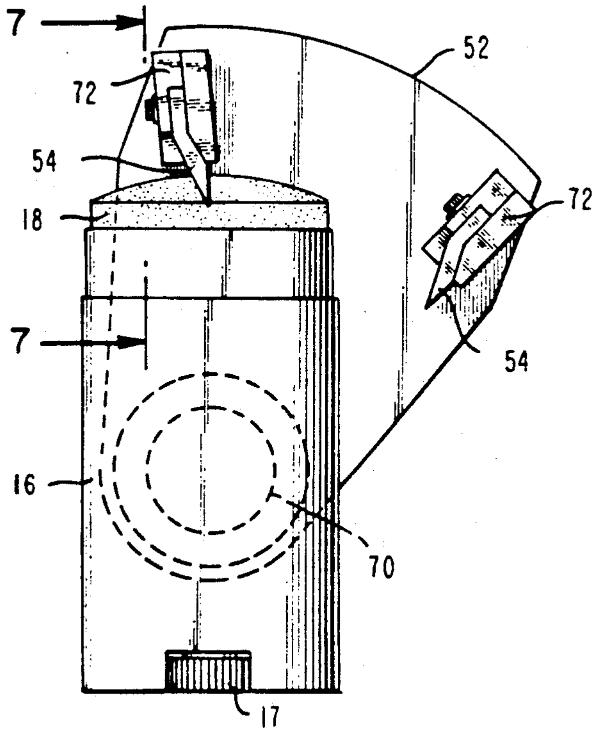
FIG. 6 is a side elevational view of the knife in relationship to a deodorant stick in a further rotated position.
Figure 7:
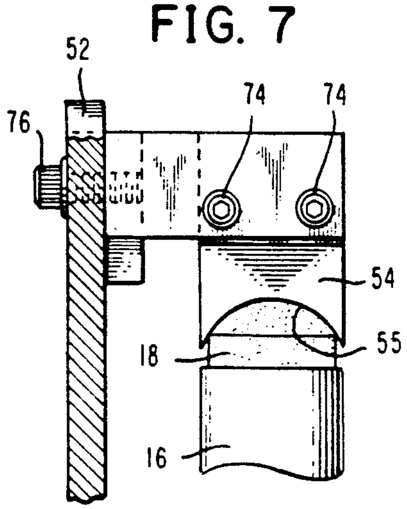
FIG. 7 is an end elevational view of the knife in relationship to the deodorant stick along plane 7—7 of FIG. 6.

FIG. 4 shows deodorant stick container 16 and deodorant stick 18 in registration with rotatable arm 52 which has secured thereto a plurality of blades 54. In this embodiment, it has been determined that the optimum number of blades is two for trimming the deodorant stick 18.

The rotation of arm 52 is about a central axis 70 secured to a mechanically chain-driven motor 72 and 74 respectively as shown in FIG. 1. Blades 54 present an arcuate cutting surface 55 to deodorant stick 18 as can best be seen in FIGS. 5 and 7. Blades 54 are secured to blade carriers 72 which extend perpendicularly from rotating arm 52. Blades 54 are secured to blade carriers 72 by means of a plurality of fastening means 74 which secure blades 54 in downwardly depending position from blade carrier 72 and permit the adjustment of the height of blades 54. Blade carrier 72 is secured to rotatable arm 52 by means of securing means 76 which permits the angular adjustment of blade carrier 72 and hence the angular adjustment of blades 54.

As discussed previously, deodorant stick container 16 with protruding deodorant stick 18 is brought into registration with trimming station 50. The sequencing causes rotatable arm 52 to rotate 360° in a vertical plane, in this embodiment, in a clockwise rotation. As best can be seen with reference to FIGS. 4 and 6, the leading blade 54 engages protruding deodorant stick 18 such that the arcuate edge 55 trims or shaves a portion of the deodorant stick to form an oval configuration. Second blade or following blade 54 trims an additional portion of the protruding deodorant stick 18 in order to achieve the desired final oval configuration. Two blades are utilized in this embodiment in order to prevent the cracking or splitting of the protruding deodorant stick when attempting to trim the desired amount of the deodorant stick with one pass by one blade 54. In this configuration, the leading blade 54 trims a portion of the deodorant stick with the following blade 54 trimming the remainder in order to achieve the desired oval configuration. This prevents splitting or cracking of the deodorant stick 18 that remains in the container.

Once rotatable arm 52 has rotated from its downwardly depending position, 360°, to its trimming position and back to its downwardly depending position, the deflector shield 56 as previously discussed, is removed, and the deodorant stick container 16 with trimmed deodorant stick 18 is sequentially moved out of registration with trimming station 50 and continues its path towards the exiting conveyor means 34. An other deodorant stick container 16 with protruding deodorant stick 18 is automatically, sequentially brought into registration with trimming station 50 and rotatable arm 52 and blades 54 perform the identical task on this subsequent deodorant stick container 16.

While the present invention has been described in connection with the exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

I claim:

1. A continuous method for trimming the top of a solid deodorant stick contained within a deodorant stick container to impart a rounded oval configuration to the top of the deodorant stick wherein the deodorant stick is solidified within container at a level proximate to the top of said container comprising:

a. transporting said deodorant stick and said deodorant stick container to a trimmer station;
b. registering the deodorant stick and deodorant stick container in alignment with a jaw transport means;
c. transporting the deodorant stick container and solid deodorant stick in said jaw transport means to a height adjustment means;
d. adjusting the solid deodorant stick to a predetermined height above the deodorant stick container;
e. transporting the solid deodorant stick and deodorant stick container by jaw transport means to a knife station;
f. registering the raised solid deodorant stick and deodorant stick container with a rotary trimming knife;
g. rotating said trimming knife about said deodorant stick container, trimming said solid deodorant stick into an oval configuration;
h. transporting said trimmed solid deodorant stick and deodorant stick container to a conveyor means;
i. releasing said trimmed solid deodorant stick and deodorant stick container onto said conveyor means;
j. repeating steps a through i on a continuous basis.

2. An apparatus for trimming solid deodorant sticks within the deodorant stick container wherein the solid deodorant stick comprises a solid material within said container substantially planer with the top of said container, said container containing a mechanism for raising said deodorant stick by the user, said means comprising a knurled adjustment knob at the bottom of the container, said apparatus comprising:

a transport registration means for gripping successive deodorant stick containers in a continuous fashion;

a height adjustment means comprising a rotating knurled knob engageable with said knurled knob on said container for raising said solid deodorant stick a predetermined height above said top of said container;

a registration means for placing said deodorant stick container and said raised solid deodorant stick in registration with a trimming means;

a trimming means comprising a rotatable arm, rotatable about said deodorant stick container and said raised solid deodorant stick, said rotatable arm having secured thereto, a plurality of arcuate knives in alignment with said raised solid deodorant stick, said arcuate knives engaging said raised solid deodorant stick upon rotation to trim solid deodorant material from said raised solid deodorant stick imparting an oval configuration to the raised portion of the solid deodorant stick;

and a conveyor registration means for registering said trimmed solid deodorant stick with a conveyor means.

3. An apparatus in accordance with claim 2 wherein hot air is provided to the area immediately adjacent to said arcuate knives to prevent the accumulation of solid stick deodorant material on said knives.

4. An apparatus in accordance with claim 2 wherein a deflector shield is disposed between said solid deodorant stick to be trimmed and the immediate preceding solid deodorant stick in order to direct trimmed material into a collection chamber and prevent the accumulation of trimmed material on said preceding stick.

5. An apparatus in accordance with claim 2 wherein said rotatable arm and said knives rotate in a vertical plane 360° about said deodorant stick container, said rotatable arm having a plurality of arcuate knives secured thereto, each arcuate knife removing a portion of said solid stick deodorant material.

6. An apparatus in accordance with claim 2 wherein said transport registration means for gripping successive deodorant stick containers in a continuous fashion comprises a rotary station comprised of a plurality of gripping jaw members for the sequential gripping, transportation and releasing of said deodorant stick container, said gripping jaw members being cam actuated between said open and closed positions.

* * * * *